United States Patent
Lee et al.

(10) Patent No.: US 10,893,569 B2
(45) Date of Patent: Jan. 12, 2021

(54) RRC STATE CHANGING METHOD OF TERMINAL, AND DEVICE SUPPORTING SAME

(71) Applicant: LG ELECTRONICS INC., Seoul (KR)

(72) Inventors: Youngdae Lee, Seoul (KR); Sangwook Han, Seoul (KR); Bokyung Byun, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 16/347,548

(22) PCT Filed: Nov. 3, 2017

(86) PCT No.: PCT/KR2017/012384
§ 371 (c)(1),
(2) Date: May 3, 2019

(87) PCT Pub. No.: WO2018/084621
PCT Pub. Date: May 11, 2018

(65) Prior Publication Data
US 2019/0254109 A1    Aug. 15, 2019

Related U.S. Application Data

(60) Provisional application No. 62/417,339, filed on Nov. 4, 2016.

(51) Int. Cl.
*H04W 76/27* (2018.01)
*H04W 68/00* (2009.01)

(52) U.S. Cl.
CPC ........... *H04W 76/27* (2018.02); *H04W 68/00* (2013.01)

(58) Field of Classification Search
None
See application file for complete search history.

(56) References Cited

U.S. PATENT DOCUMENTS

| | | |
|---|---|---|
| 2013/0194941 A1 | 8/2013 | Lu et al. |
| 2014/0315552 A1 | 10/2014 | Han et al. |
| 2015/0305056 A1 | 10/2015 | Vangala et al. |

(Continued)

FOREIGN PATENT DOCUMENTS

| | | |
|---|---|---|
| WO | 2013169789 | 11/2013 |
| WO | 2015021284 | 2/2015 |

OTHER PUBLICATIONS

PCT International Application No. PCT/KR2017/012384, International Search Report dated Feb. 7, 2018, 14 pages.

(Continued)

*Primary Examiner* — Rebecca E Song
(74) *Attorney, Agent, or Firm* — Lee Hong Degerman Kang Waimey (57) ABSTRACT

Provided is a method for a terminal in an RRC inactive (RRC_INACTIVE) state to change an RRC state in a wireless communication system. The method comprises: a step of receiving, from a network, an indication indicating to enter an RRC idle state; a step of determining if the indication is valid for a terminal; and a step of entering the RRC idle state if it is determined that the indication is valid for the terminal.

14 Claims, 9 Drawing Sheets

(56) References Cited

U.S. PATENT DOCUMENTS

| | | | |
|---|---|---|---|
| 2016/0234736 A1* | 8/2016 | Kubota et al. | H04W 36/0083 370/312 |
| 2017/0290084 A1* | 10/2017 | Wu et al. | H04W 76/27 455/450 |
| 2020/0022214 A1* | 1/2020 | Takahashi et al. | H04W 88/023 370/329 |

OTHER PUBLICATIONS

3rd Generation Partnership Project (3GPP), "Technical Specification Group Services and System Aspects; Study on Architecture for Next Generation System (Release 14)," 3GPP TR 23.799 V1.1.0, Oct. 2016, 503 pages.

* cited by examiner

| 0 | 1 | 0 | 0 | 1 | 0 | 0 | 1 |

RRC STATE CHANGING METHOD OF TERMINAL, AND DEVICE SUPPORTING SAME

CROSS-REFERENCE TO RELATED APPLICATIONS

This application is the National Stage filing under 35 U.S.C. 371 of International Application No. PCT/KR2017/012384, filed on Nov. 3, 2017, which claims the benefit of U.S. Provisional Application No. 62/417,339, filed on Nov. 4, 2016, the contents of which are hereby incorporated by reference herein in its entirety.

BACKGROUND OF THE INVENTION

Field of the Invention

The present invention relates to a technique for shifting an RRC state by a User Equipment in an RRC inactive state.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In NR standardization conference, basically, an RRC state is defined as RRC_CONNECTED state and RRC_IDLE state, and additionally, RRC_INACTIVE state has been introduced. In order to reduce power consumption, a User Equipment in the RRC_INACTIVE state performs a wireless control procedure in the format which is similar to the RRC_IDLE state. However, in order to minimize the control procedure processed when the User Equipment is shifted to the RRC_CONNECTED state, the User Equipment maintains the connection state between the User Equipment and a network similarly to the RRC_CONNECTED state.

As such, a discussion for the RRC_INACTIVE state has been continued, and particularly, a study has been done for how to control a User Equipment in the RRC_INACTIVE state in an aspect of a network.

SUMMARY OF THE INVENTION

Since the RRC_INACTIVE state is regarded as a sub-state of the RRC_CONNECTED state, when the number of User Equipments in the RRC_INACTIVE state increases, network traffic occurs. Accordingly, in the aspect of a Base Station, it is required to restrict the number of User Equipments in the RRC_INACTIVE state. However, according to the conventional art, it has not been known a method for control a User Equipment in the RRC_INACTIVE state to access a network.

According to an embodiment of the present invention, it is provided a method for shifting an RRC state performed by a User Equipment (UE) in an RRC inactive (RRC_INACTIVE) state in a wireless communication system including receiving an indicator indicating to enter an RRC idle state from a network; determining whether the indicator is valid for the UE; and entering the RRC idle state when the indicator is valid for the UE.

The indicator may be configured with a bitmap having a size of N bits, and the step of determining may include determining whether the indicator is valid for the UE based on a result of performing a MOD operation of the bitmap and a UE ID.

The step of determining, the indicator may be determined to be valid for the UE when a bit of the bitmap corresponding to the MOD operation result indicates 1.

The UE ID may be one of an International Mobile Subscriber Identity (IMSI), a SAE-Temporary Mobile Subscriber Identity (S-TMSI), a resume ID and a Radio Network Temporary Identifier (RNTI).

The indicator may be received through a paging message.

The indicator may be received through a PDCCH message.

The indicator may be received through system information (SI).

The step of receiving an indicator may include: receiving a notification notifying that the system information for the RRC state shift is changed through a paging message; and requesting a transmission of the system information to the network through the notification.

According to another embodiment of the present invention, it is provided a User Equipment (UE) for shifting an RRC state from an RRC inactive (RRC_INACTIVE) state in a wireless communication system including a memory; a transceiver; and a processor for connecting the transceiver, wherein the processor is configured to: receive an indicator indicating to enter an RRC idle state from a network; determine whether the indicator is valid for the UE; and enter the RRC idle state when the indicator is valid for the UE.

The indicator may instruct one or more UEs among the UEs located in the network to enter the RRC idle state.

The indicator may be configured with a bitmap having a size of N bits, and the processor may be configured to determine whether the indicator is valid for the UE based on a result of performing a MOD operation of the bitmap and a UE ID.

The processor may determine that the indicator is valid for the UE when a bit of the bitmap corresponding to the MOD operation result indicates 1.

The UE ID may be one of an International Mobile Subscriber Identity (IMSI), a SAE-Temporary Mobile Subscriber Identity (S-TMSI), a resume ID and a Radio Network Temporary Identifier (RNTI).

The indicator may be received through a paging message.

The indicator may be received through a PDCCH message.

The indicator may be received through system information (SI).

According to an embodiment of the present invention, the number of User Equipments in the RRC_INACTIVE state is maintained properly, and an excessive network traffic load can be relieved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
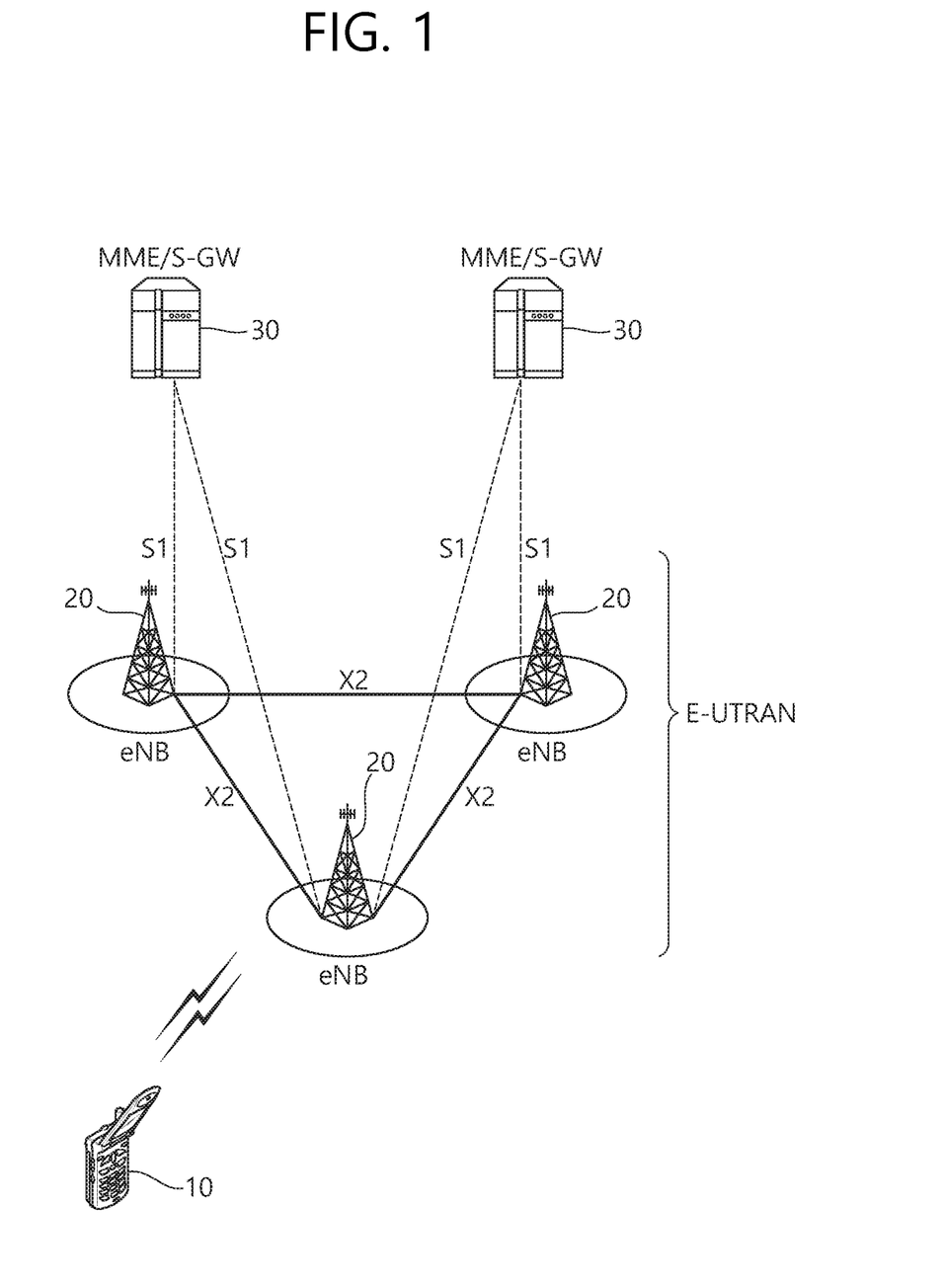
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
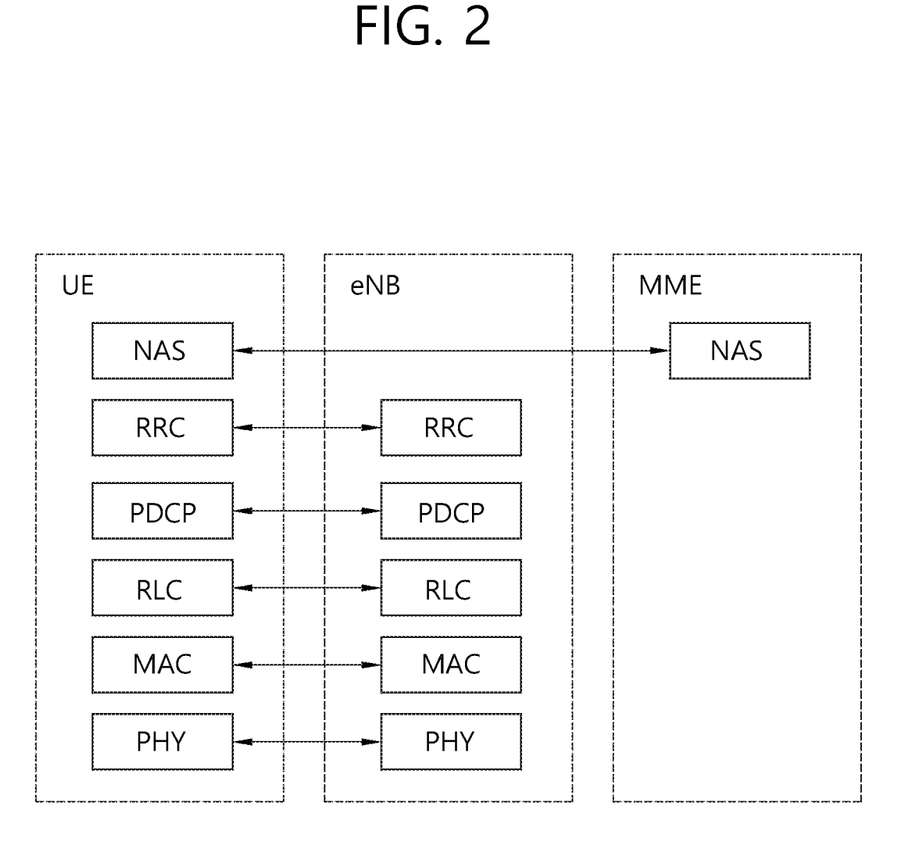
FIG. 2 shows a control plane of a radio interface protocol of an LTE system.
Figure 3:
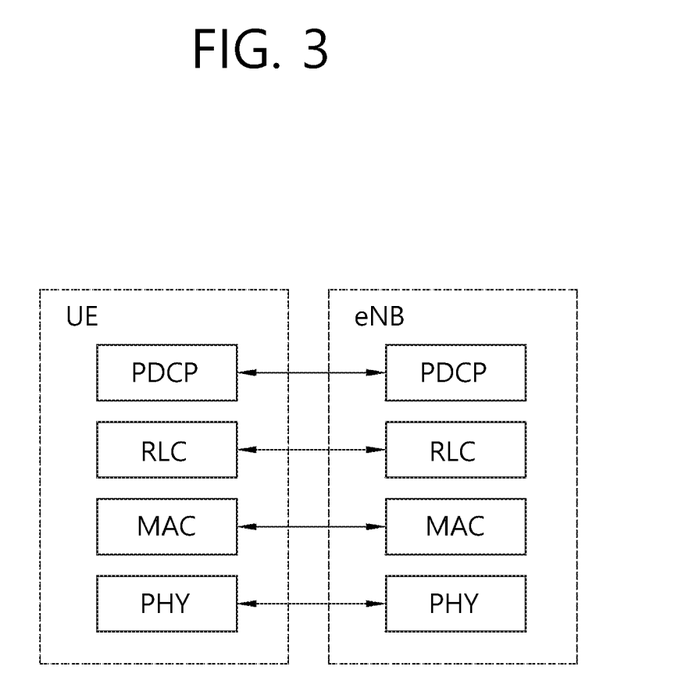
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
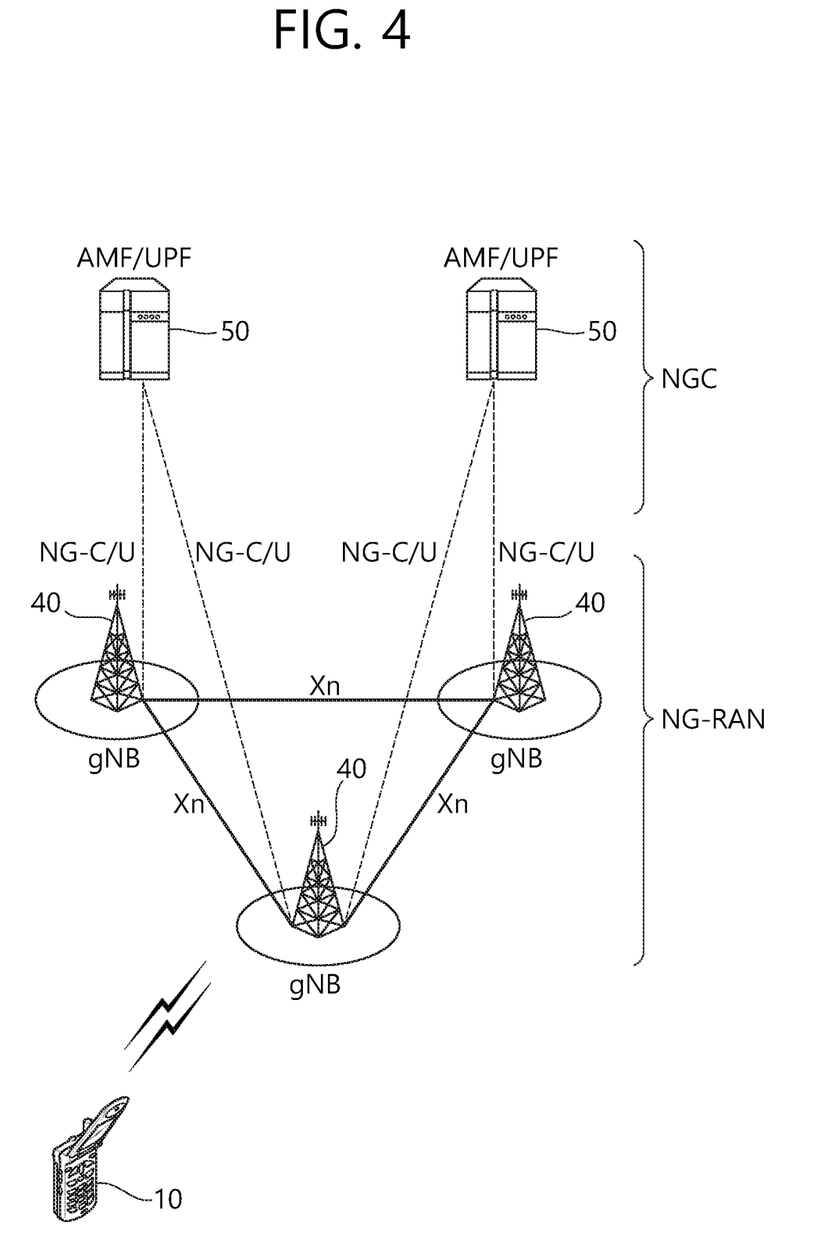
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC INACTIVE state of a UE is described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

A UE in the LC state maintains a stop state or an inactive state while the stores a LC UE context to an eNB. When the number of UEs in the LC state increases, the eNB is required to offload the UEs to the RRC idle state in order to restrict the count of storing the LC UE context to the eNB. In addition, since the LC state is regarded as a sub state of the RRC connected state, according to the conventional art, it has not been known a method for control a UE in the LC state to access a network. In the case that many UEs in the LC state are intended to transit to the RRC connected state from the LC state simultaneously, network traffic occurs. In an aspect of the eNB, it is required to restrict the number of UEs in the LC state. According to an embodiment of the present invention, in order to maintain the number of UEs in the LC state, the stop state and the inactive state properly, it is proposed a method of offloading a UE in the LC state.

Hereinafter, it is described a method for a UE to transit an RRC state according to an embodiment. In the present invention, it is described the LC state and the RRC inactive state to the RRC inactive state commonly. According to the embodiment of the present invention, in the case that the number of UEs in the RRC inactive state under the control of a particular eNB exceeds a threshold value, the eNB may transmit an indicator indicating to perform an offloading to the UE in the RRC inactive state. In the case that the UE in the RRC inactive state receives the indicator, the UE may enter the RRC idle state from the RRC inactive state.

Figure 5:
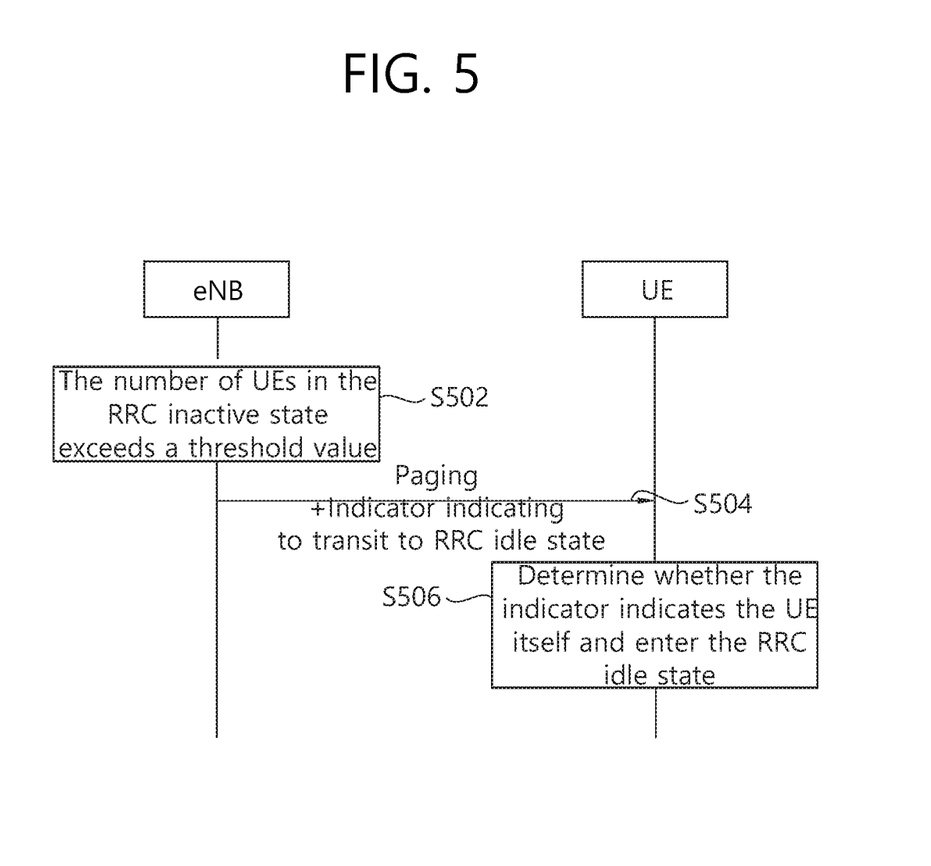
FIG. 5 is a flowchart for describing a method for shifting an RRC state of a UE according to an embodiment of the present invention.

FIG. 5 is a flowchart for describing a method for transiting an RRC state of a UE according to an embodiment of the present invention. In this embodiment, an eNB may instruct an RRC inactive UE to transit an RRC state to an RRC idle state through paging.

In step S502, the eNB may determine whether the number of UEs in the RRC inactive state under the control of the eNB exceeds a threshold value.

In step S504, in the case that the number of UEs in the RRC inactive state exceeds a threshold value, the eNB may instruct a specific UE in the RRC inactive state to enter the RRC idle state through paging.

Particularly, the eNB may perform a paging based on RAN for multiple UEs. Here, the multiple UEs may be UEs in a paging area configured by the eNB. The eNB may transmit an indicator for RRC state change to the multiple UEs through paging. However, not all UEs that receive the paging enter the RRC idle state, but the UE that receives the paging determines whether the indicator is an indicator to the UE itself autonomously, and accordingly, at least a part of the UEs that receive the paging may enter the RRC idle state.

According to an embodiment, the eNB may transmit an offloading bitmap having N bit size through a paging message. According to another embodiment, the eNB may transmit an offloading bitmap having N bit size through a PDCCH message. According to still another embodiment, the eNB may transmit an offloading bitmap having 1 bit size through a paging message.

In step S506, the UE may read the received bitmap or the indicator and may determine whether the bitmap or the indicator indicates the UE itself. That is, the UE may determine whether the bitmap or the indicator is valid for the UE itself. In the case that the bitmap or the indicator is determined to indicate the UE itself, the UE may enter the RRC idle state.

According to an embodiment, in the case that the UE in the RRC inactive state receives the offloading bitmap having N bit size included in the paging message, the UE may match a MOD operation result for the UE identity (ID) to the bitmap. In the case that a bit of the bitmap corresponding to the MOD operation result of the UE ID indicates 1, the UE may determine the bitmap to indicate the UE itself, and enter the RRC idle state.

According to another embodiment, the UE in the RRC inactive state may monitor or decode the offloading bitmap having N bit size in downlink control information (DCI) of PDCCH. The UE may match a MOD operation result for the UE identity (ID) to the bitmap. In the case that a bit of the bitmap corresponding to the MOD operation result of UE ID indicates 1, the UE may determine the bitmap to indicate the UE itself, and enter the RRC idle state.

According to still another embodiment, in the case that the UE reads the offloading bitmap having 1 bit size in the paging message, the UE in the RRC inactive state may enter the RRC idle state.

Meanwhile, the UE ID may be IMSI, S-TMSI, resume ID, RNTI or other UE ID allocated by RAN. Here, the UE ID may be configured to include N value (e.g., 8) for performing a MOD operation.

In this embodiment, the paging may page the UE in the RRC inactive state or the RRC idle state instruct located in the paging area as well as instruct the UE in the RRC inactive state to enter the RRC idle state. Accordingly, in the case that the UE in the RRC inactive state becomes an object of paging, notwithstanding the indicator, the UE may not enter the RRC idle state but operate according to its own paging.

Figure 6:
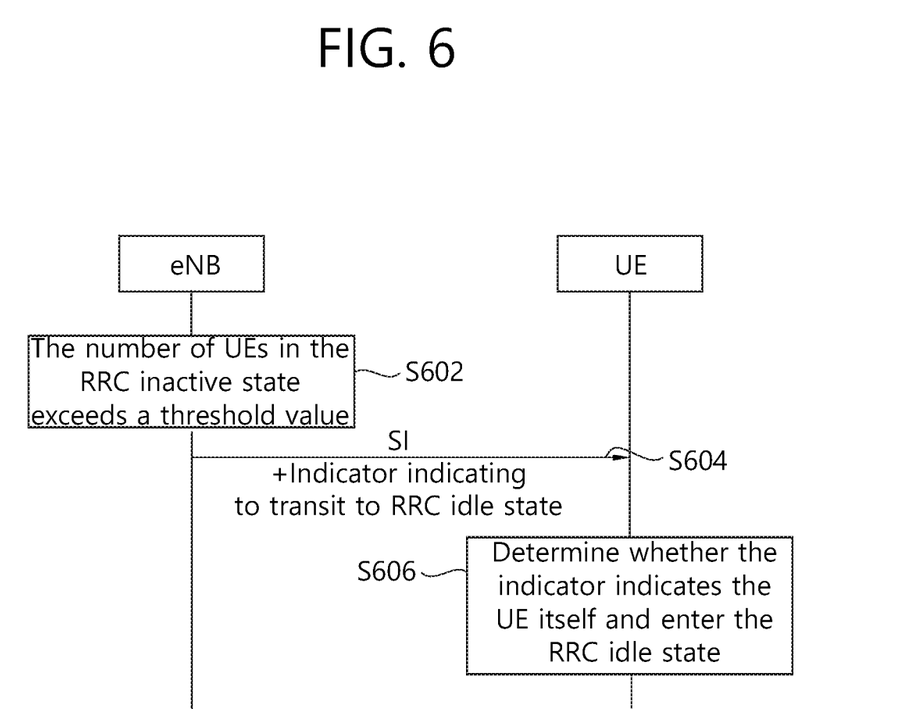
FIG. 6 is a flowchart for describing a method for shifting an RRC state of a UE according to an embodiment of the present invention.

FIG. 6 is a flowchart for describing a method for transiting an RRC state of a UE according to an embodiment of the present invention. In this embodiment, an eNB may instruct UE in RRC inactive to enter an RRC state to an RRC idle state through a transmission of system information.

In step S602, the eNB may determine whether the number of UEs in the RRC inactive state under the control of the eNB exceeds a threshold value.

In step S604, in the case that the number of UEs in the RRC inactive state exceeds a threshold value, the eNB may instruct a specific UE in the RRC inactive state to enter the RRC idle state through the system information (SI). For this, in the case that the eNB performs RAN based paging, the eNB may transmit an indicator of 1 bit in order to inform the system information for the UE in the RRC inactive state to offload is changed through a paging message.

In step S606, the UE may read the received indicator and may enter the RRC idle state by determining whether the indicator indicates the UE itself.

Particularly, the UE may read a system information change notification bitmap of 1 bit for a UE in the RRC inactive state to offload in the paging message, and the UE may request the system information including an offloading bitmap having a size of N bits.

The UE may decode the offloading bitmap having a size of N bits in the system information. Particularly, the UE may match a MOD operation result for the UE identity (ID) to the bitmap. In the case that a bit of the bitmap corresponding to the MOD operation result of the UE ID indicates 1, the UE may determine the bitmap to indicate the UE itself, and enter the RRC idle state.

Figure 7:
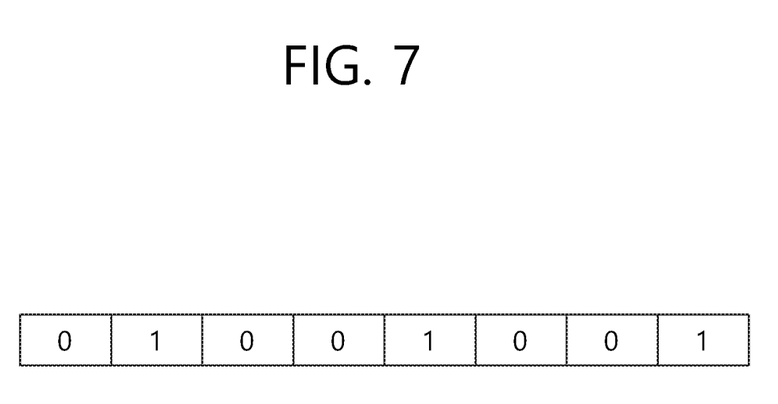
FIG. 7 is a diagram illustrating a bitmap included in an indicator according to an embodiment of the present invention.

FIG. 7 is a diagram illustrating a bitmap included in an indicator according to an embodiment of the present invention. According to this embodiment, the bitmap may be transmitted to a UE through a paging message, DCI of PDCCH or system information.

Referring to FIG. 7, a UE in the RRC inactive state may receive a bitmap having 8 bit size. In addition, the second, the fifth and eighth bits (i.e., #1, #4 and #7 bits) of the bitmap may be 1. In this case, in the case that the MOD operation result (e.g., N is 8) of a UE ID is 1, 4 or 7, the UE in the RRC inactive state may determine that the bitmap indicates the UE itself, and enter the RRC idle state.

Figure 8:
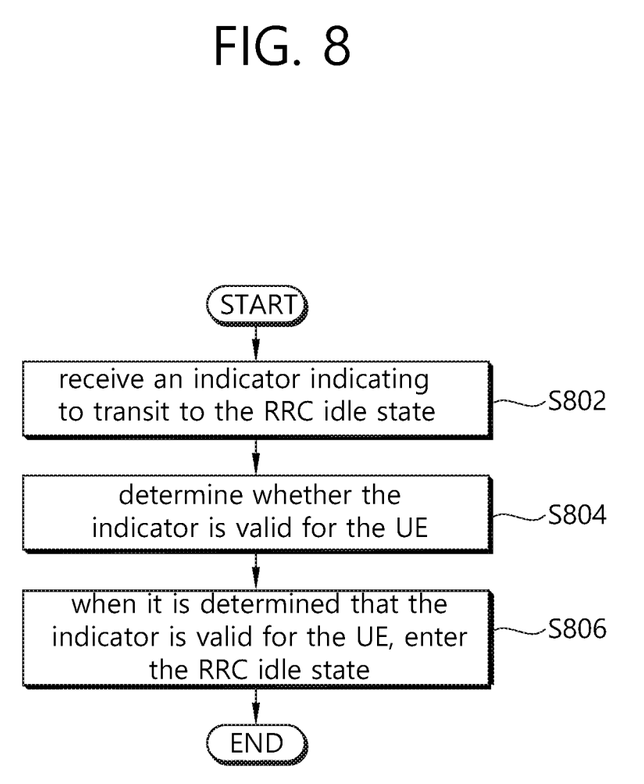
FIG. 8 is a flowchart for describing a method for shifting an RRC state of a UE according to an embodiment of the present invention.

FIG. 8 is a flowchart for describing a method for transiting an RRC state of a UE according to an embodiment of the present invention.

In step S802, a UE may receive an indicator indicating to enter the RRC idle state from a network. The indicator may be configured with a bitmap having a size of N bits. The indicator may be received in the UE through a PDCCH message or system information. In the case that the indicator is received through the system information, the UE may be notified that the system information for an RRC state transit through a paging message, and receive the system information by requesting a transmission of the system information to the network according to the notification.

In step, S804, the UE may determine whether the indicator is valid for the UE. Particularly, in the case that the indicator is configured with a bitmap having a size of N bits, the UE may determine whether the indicator is valid for the UE based on the result of performing a MOD operation of the bitmap and the UE ID. That is, in the case that a bit of the bitmap corresponding to the MOD operation result indicates 1, the UE may determine that the indicator is valid for the UE. Here, the UE ID may be one of an International Mobile Subscriber Identity (IMSI), a SAE-Temporary Mobile Subscriber Identity (S-TMSI), a resume ID and a Radio Network Temporary Identifier (RNTI).

In step, S806, in the case that it is determined that the indicator is valid for the UE, the UE may enter the RRC idle state. That is, in the case that the indicator indicates the UE itself, the UE may enter the RRC idle state.

Figure 9:
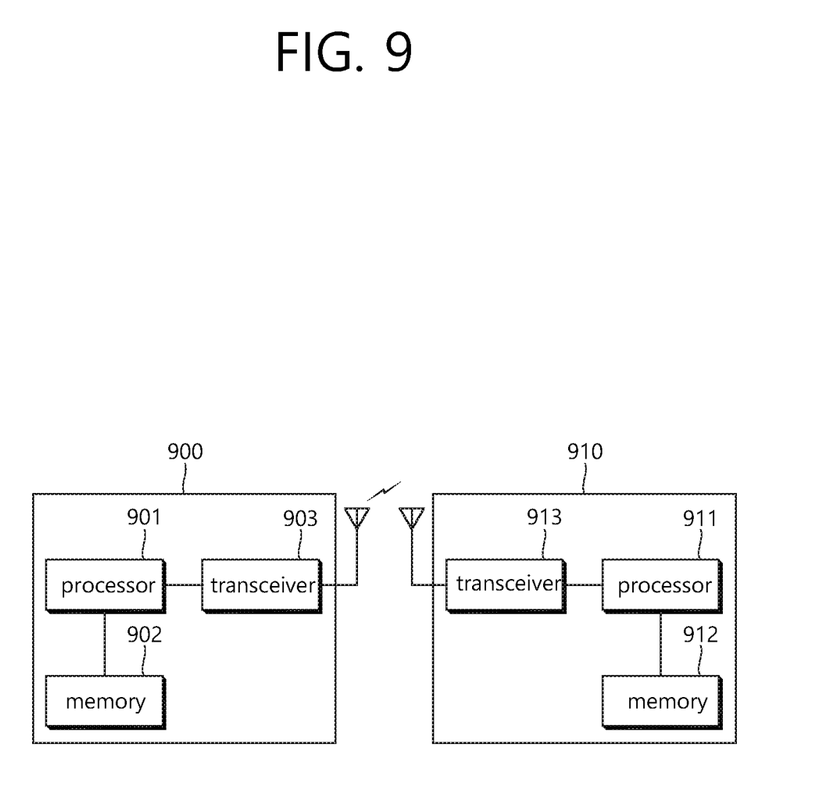
FIG. 9 is a block diagram illustrating a wireless apparatus in which an embodiment of the present invention can be implemented.

FIG. 9 is a block diagram illustrating a wireless apparatus in which an embodiment of the present invention can be implemented.

A BS 900 includes a processor 901, a memory 902, and a radio frequency (RF) unit 903. The memory 902 is coupled to the processor 901, and stores a variety of information for driving the processor 901. The RF unit 903 is coupled to the processor 901, and transmits and/or receives a radio signal. The processor 901 implements the proposed functions, procedures, and/or methods. In the aforementioned embodiments, an operation of the BS may be implemented by the processor 901.

A UE 910 includes a processor 911, a memory 912, and an RF unit 913. The memory 912 is coupled to the processor 911, and stores a variety of information for driving the processor 911. The RF unit 913 is coupled to the processor 911, and transmits and/or receives a radio signal. The processor 61 implements the proposed functions, procedures, and/or methods. In the aforementioned embodiments, an operation of the UE 910 may be implemented by the processor 911.

The processors 911 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transiting an RRC state performed by a User Equipment (UE) in an RRC inactive (RRC_INACTIVE) state in a wireless communication system, the method comprising:
   receiving an indicator indicating to enter an RRC idle state from a network,
   wherein the indicator is configured with a bitmap having a size of N bits;
   determining whether the indicator is valid for the UE based on a result of performing a MOD operation of the bitmap and a UE ID; and
   entering the RRC idle state when the indicator is valid for the UE.

2. The method of claim 1, wherein in the step of determining, the indicator is determined to be valid for the UE when a bit of the bitmap corresponding to the MOD operation result indicates 1.

3. The method of claim 1, wherein the UE ID is one of an International Mobile Subscriber Identity (IMSI), a SAE-Temporary Mobile Subscriber Identity (S-TMSI), a resume ID and a Radio Network Temporary Identifier (RNTI).

4. The method of claim 1, wherein the indicator is received through a paging message.

5. The method of claim 1, wherein the indicator is received through a PDCCH message.

6. The method of claim 1, wherein the indicator is received through system information (SI).

7. The method of claim 6, wherein the step of receiving an indicator includes:
  receiving a notification notifying that the system information for the RRC state shift is changed through a paging message; and
  requesting a transmission of the system information to the network upon receiving the notification.

8. The method of claim 1, wherein the UE communicates with at least one of a mobile terminal, a network or autonomous vehicles other than the UE.

9. A User Equipment (UE) for transiting an RRC state from an RRC inactive (RRC_INACTIVE) state in a wireless communication system, comprising:
  a memory; a transceiver; and a processor for connecting the transceiver, wherein the processor is configured to:
  control the transceiver to receive an indicator indicating to enter an RRC idle state from a network,
  wherein the indicator is configured with a bitmap having a size of N bits;
  determine whether the indicator is valid for the UE based on a result of performing a MOD operation of the bitmap and a UE ID; and
  enter the RRC idle state when the indicator is valid for the UE.

10. The UE of claim 9, wherein the processor determines that the indicator is valid for the UE when a bit of the bitmap corresponding to the MOD operation result indicates 1.

11. The UE of claim 9, wherein the UE ID is one of an International Mobile Subscriber Identity (IMSI), a SAE-Temporary Mobile Subscriber Identity (S-TMSI), a resume ID and a Radio Network Temporary Identifier (RNTI).

12. The UE of claim 9, wherein the indicator is received through a paging message.

13. The UE of claim 9, wherein the indicator is received through a PDCCH message.

14. The UE of claim 9, wherein the indicator is received through system information (SI).

* * * * *